No. 751,844. Patented February 9, 1904.

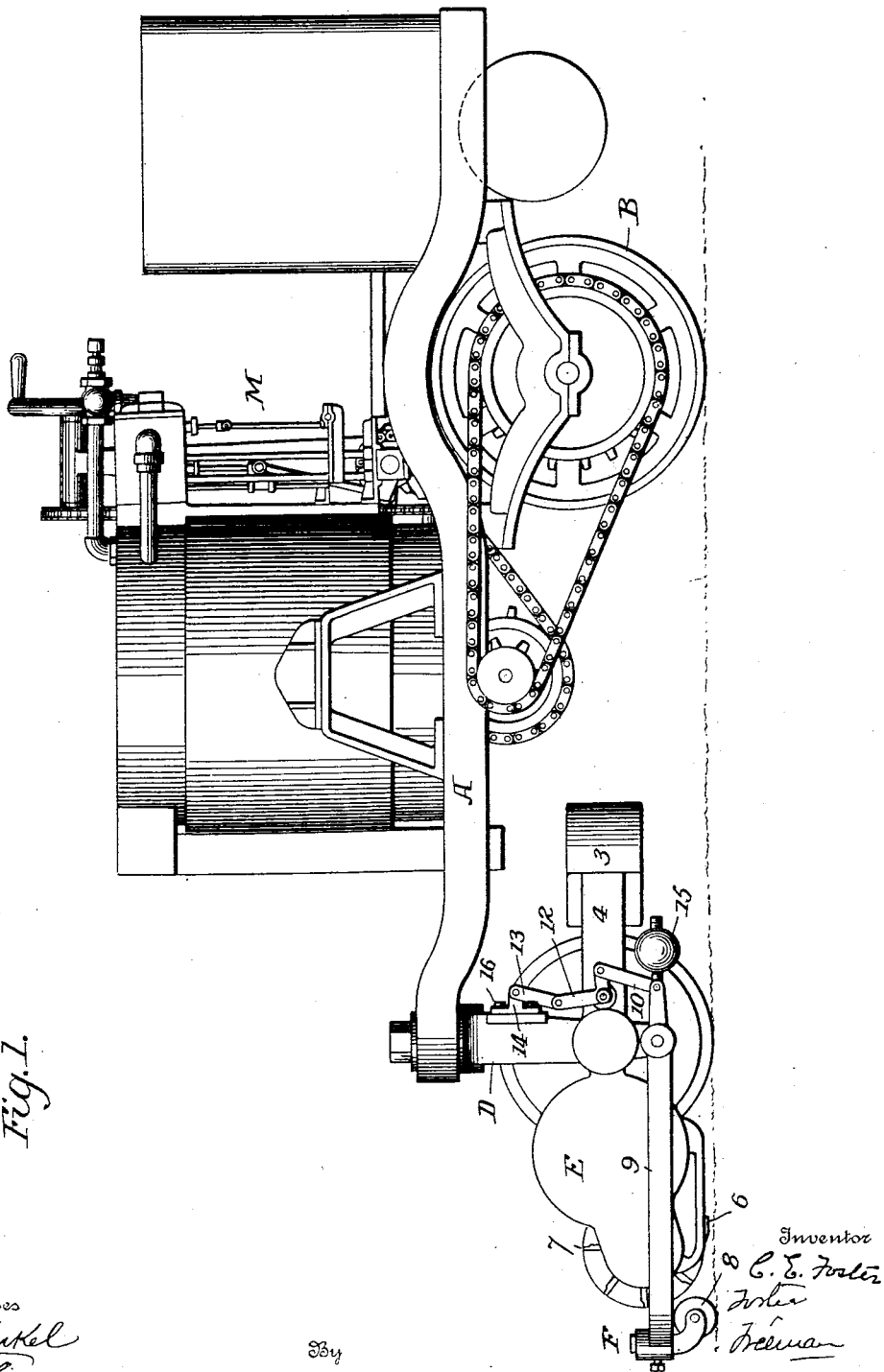

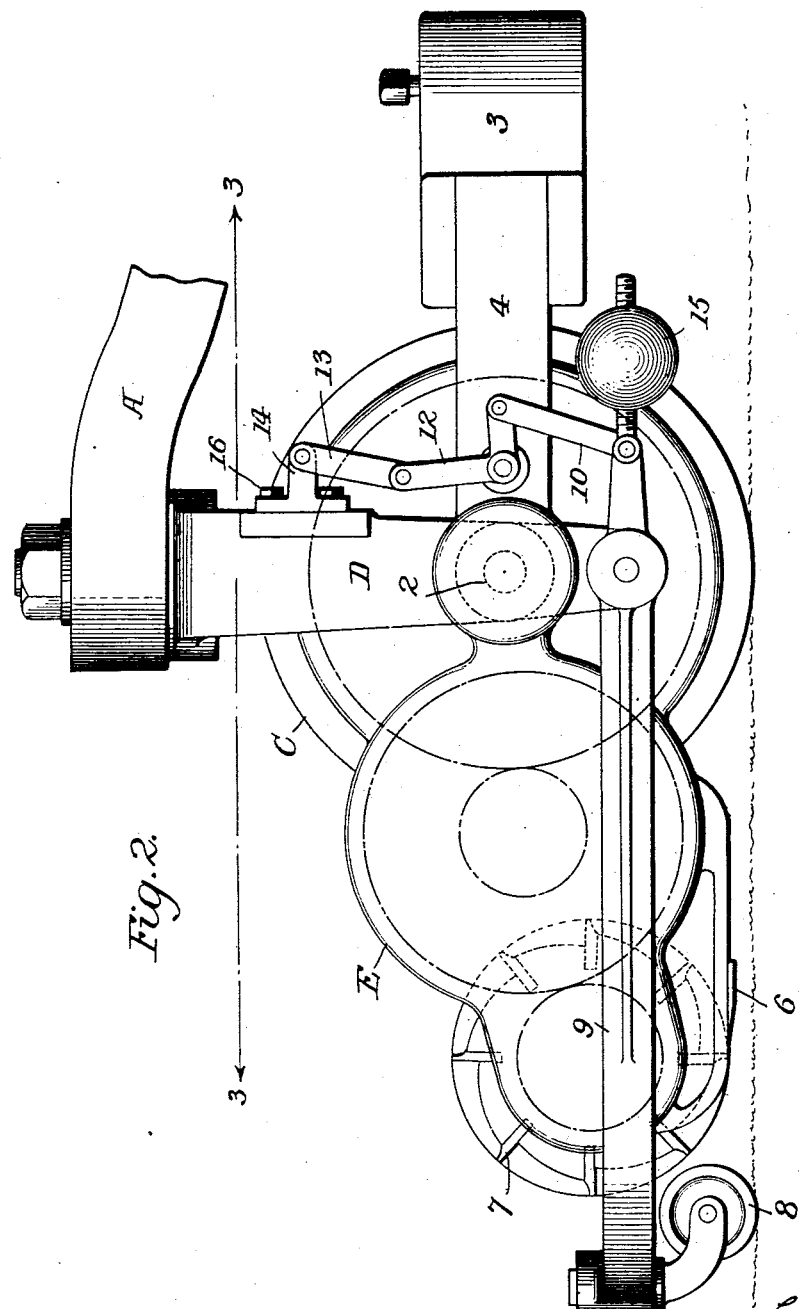

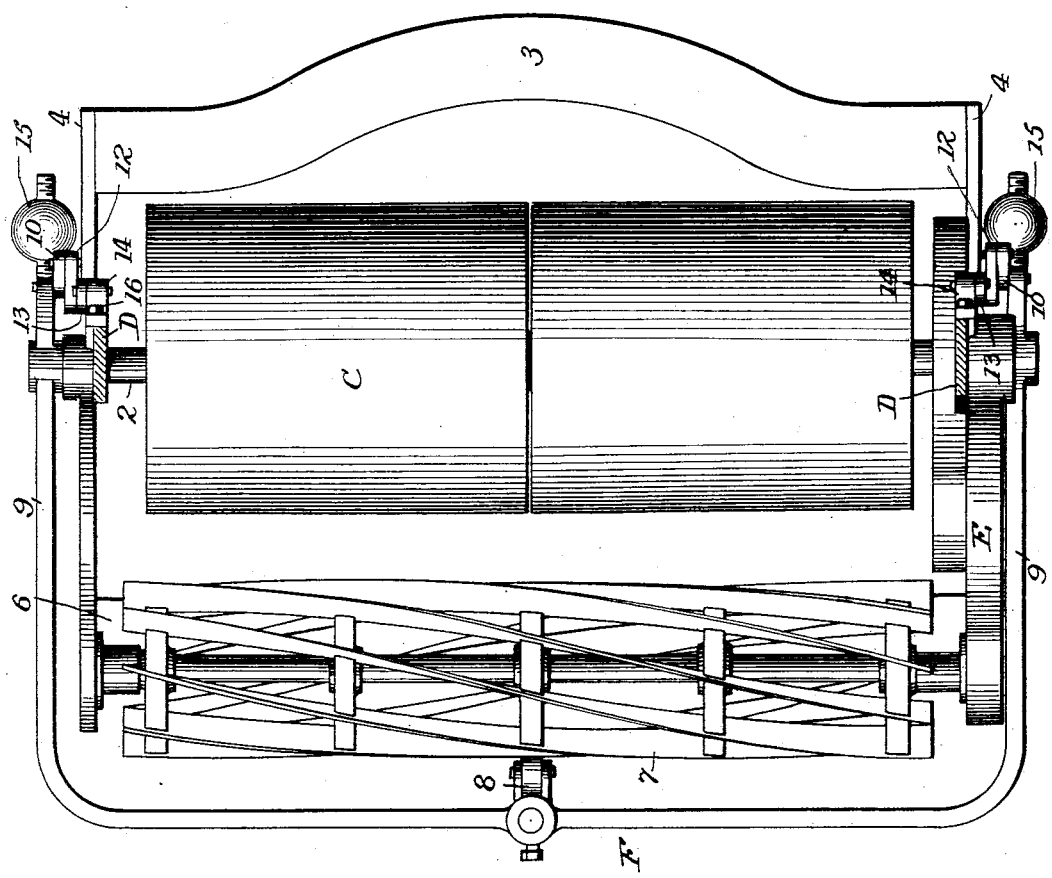

UNITED STATES PATENT OFFICE.

CHARLES E. FOSTER, OF WASHINGTON, DISTRICT OF COLUMBIA, ASSIGNOR TO WILLIAM P. SIMPSON, OF OVERBROOK, PENNSYLVANIA.

LAWN-MOWER.

SPECIFICATION forming part of Letters Patent No. 751,844, dated February 9, 1904.

Application filed November 29, 1902. Serial No. 133,296. (No model.)

*To all whom it may concern:*

Be it known that I, CHARLES E. FOSTER, a citizen of the United States, residing at Washington, District of Columbia, have invented certain new and useful Improvements in Lawn-Mowers, of which the following is a specification.

Heretofore it has been customary in mowers and grass-cutters to regulate the height of the cut by varying the distance between the cutters and the bearing-points of wheels or rollers carried by the cutter-frame and traversing the ground. This has been found objectionable, as the wheels or rollers crush down the grass so that it is not properly presented to the cutters when they are carried over the depressed portions of the lawn, and the latter presents a streaked appearance necessitating often finishing operations with a hand-cutter. To overcome these objections, I suspend the cutter-frame, dispensing with any supporting rolls or wheels, and regulate the cut by means of a control device, which bears lightly upon the ground, traversing the same adjacent to the cutters and operating to shift the frame, as fully set forth hereinafter and as illustrated in the accompanying drawings, in which—

Figure 1 is a side elevation of a motor lawn-mower roller and cutter embodying my invention; Fig. 2, a side elevation, enlarged, of the cutter devices and adjuncts; Fig. 3, a plan of the roller and cutter frames and adjuncts.

The frame A of the mower may be of any required construction and supported in any suitable manner, and when it is part of a combined lawn mower and roller, as shown, the roller B may be also a traction-roller, as shown, or it may, as is sometimes the case, be independent of the traction-rollers. As shown, there is an independent pivoted frame D, carrying a roller C for driving the cutters; but these may be otherwise driven and the cutter-frame E may be supported to be movable vertically from any part of the frame and in any suitable manner. As shown, the cutter-frame E swings about the shaft 2 of the driving-roller C and is preferably so counterbalanced by a weight 3, adjustable on rearwardly-projecting arms 4, that the frame may be raised and lowered by the application of but little force. The frame E carries suitable cutters, as a knife 6 and rotary knife-head 7, the latter driven suitably, as by gears, from the driving-roll or other source of power.

Combined with the movable cutter-frame is a controller F, shown as consisting of a wheel 8, supported to traverse the ground adjacent to and preferably ahead of the cutters and connected with devices whereby the cutter-frame is raised and lowered as the controller rises and descends, according to the contour of the ground.

Any suitable intermediate devices may be used. As shown, a lever 9, pivoted to the frame D, carries the roller 8 at one end and is connected by a link 10 to one member, 12, of a pair of toggles 12 13, one pivoted to the frame D and the other to the cutter-frame, so that the front of the latter will be lifted as the toggle is straightened and will descend as the toggle is bent.

The parts are so adjusted when on a level that the cutters will then be at the desired height from the ground, and consequently if on moving forward there is a dip or descent of the ground while the wheel-base is yet horizontal the control-wheel 8 will move downward, the toggle will be bent, and the cutters will proportionately descend, while if the ground rises the control-wheel 8 will be lifted, straightening the toggle and lifting the cutters proportionately. As there is but one wheel 8 and as this supports only the weight of the lever 9 it has but little crushing effect, and this may be reduced to a minimum by a counterbalance-weight 15. Springs may be substituted for the counterweights shown.

It will be seen that by the above-described means I maintain the cutters at substantially a uniform height from the ground, but dispense altogether with the usual bearings of the cutter-frame, that there is but one bearing-point on the grass instead of four, and that the pressure at this point is so light as to have no deleterious effect.

The wheel 8 is preferably swiveled, as shown, and while a wheel will operate most effectively a shoe or other device supported to traverse the ground adjacent to the cutters may be used.

To regulate the height of the cut, some part of the connections must be adjustable. For instance, the member 13 of the toggle may be pivoted to a bracket 14, secured by bolts 16 adjustably to the frame D. Where the lawn-roller is at the front and carried by the traction-frame, the cutter-frame will of course be supported by the traction-frame instead of by the supplemental pivoted frame D.

The machine may be propelled in any suitable manner, as by a motor M, geared to drive one of the rollers.

Without limiting myself to the construction and arrangement shown, I claim—

1. The combination with a mower-frame and a cutter-frame supported movably by the mower-frame, of means for shifting the position of the cutter-frame vertically, and a controller-bearing on the ground and connected to operate the shifting means, substantially as set forth.

2. The combination with a mower-frame and a counterbalanced cutter-frame movably supported by the mower-frame, of means for shifting the position of the cutter-frame, to carry the cutters to and from the ground, and a controller-bearing on the ground and connected to operate the shifting means, substantially as set forth.

3. The combination with a mower-frame and a cutter-frame supported by the mower-frame, of adjustable means for shifting the vertical position of the cutter-frame, and a controller-bearing on the ground and connected to operate the shifting means, substantially as set forth.

4. The combination with a mower-frame and a cutter-frame movably supported by the mower-frame, of means for shifting the vertical position of the cutter-frame, a controller consisting of a bearing traversing the ground in advance of the cutter and supported to follow the contour of the ground, and connections between the controller and shifting means, substantially as set forth.

5. The combination with a mower-frame and a cutter-frame supported by the mower-frame, of means for shifting the vertical position of the cutter-frame, a controller consisting of a bearing traversing the ground in advance of the cutter and supported to follow the contour of the ground, connections between the controller and shifting means, and means for varying the extent of movement imparted to the cutter-frame from the controller, substantially as set forth.

6. The combination with the mower-frame and cutter-frame supported by the mower-frame, of a controller-bearing on the ground, and supported independently of the cutter-frame, and connections for shifting the cutter-frame vertically on the vertical movement of the controller, substantially as set forth.

7. The combination of the traction-frame of a mower, of a roller-frame pivoted thereto, a cutter-frame hung to the roller-frame, a controller-bearing on the ground and supported independently of the cutter-frame, and connections for shifting the cutter-frame vertically on the vertical movement of the controller, substantially as set forth.

In testimony whereof I have signed my name to this specification in the presence of two subscribing witnesses.

CHARLES E. FOSTER.

Witnesses:
   H. M. GILLMAN, Jr.,
   W. CLARENCE DUVALL.